United States Patent
Kwapniewski et al.

(10) Patent No.: US 8,499,096 B2
(45) Date of Patent: *Jul. 30, 2013

(54) ADAPTIVE ROUTING OF CONTENT REQUESTS USING MULTIPLE ANYCAST ADDRESSES

(75) Inventors: Richard T. Kwapniewski, Middletown, NJ (US); Han Q. Nguyen, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,259

(22) Filed: Sep. 14, 2012

(65) Prior Publication Data

US 2013/0013786 A1 Jan. 10, 2013

Related U.S. Application Data

(63) Continuation of application No. 12/546,421, filed on Aug. 24, 2009, now Pat. No. 8,296,458.

(51) Int. Cl.
*G06F 15/173* (2006.01)

(52) U.S. Cl.
USPC .......................................... 709/238; 709/220

(58) Field of Classification Search
USPC ................................. 709/220, 238
See application file for complete search history.

(56) References Cited

U.S. PATENT DOCUMENTS

| | | | |
|---|---|---|---|
| 4,466,060 A | 8/1984 | Riddle | |
| 5,822,320 A | 10/1998 | Horikawa et al. | |
| 6,327,252 B1 | 12/2001 | Silton et al. | |
| 6,415,323 B1 | 7/2002 | McCanne et al. | |
| 6,687,731 B1 | 2/2004 | Kavak | |
| 6,785,704 B1 | 8/2004 | McCanne | |
| 6,856,991 B1 | 2/2005 | Srivastava | |
| 7,139,834 B1 | 11/2006 | Albanese et al. | |
| 7,280,545 B1 | 10/2007 | Nagle | |
| 7,555,561 B2 | 6/2009 | Michel | |
| 7,680,938 B2 | 3/2010 | Oesterreicher et al. | |
| 2004/0107234 A1 | 6/2004 | Rajahalme | |
| 2005/0044141 A1 | 2/2005 | Hameleers et al. | |
| 2005/0050377 A1* | 3/2005 | Chan et al. ................ 714/4 |
| 2006/0233154 A1 | 10/2006 | Eckert et al. | |
| 2008/0080513 A1 | 4/2008 | Kang et al. | |
| 2011/0047252 A1 | 2/2011 | Kwapniewski et al. | |

* cited by examiner

*Primary Examiner* — David Lazaro
*Assistant Examiner* — Marie Georges Henry
(74) *Attorney, Agent, or Firm* — Akerman Senterfitt; Michael K. Dixon; Roy Zachariah

(57) ABSTRACT

A system includes a plurality of cache servers and a domain name server. Each of the cache servers is configured to respond to a content request. The plurality of cache servers is divided into a plurality of subsets and configured to respond to an anycast address for each subset to which the cache server belongs. The domain name server is configured to receive a request from a requestor for a cache server address, identify an anycast address for a largest available subset, and provide the anycast address of the largest available subset to the requestor.

20 Claims, 6 Drawing Sheets

ADAPTIVE ROUTING OF CONTENT REQUESTS USING MULTIPLE ANYCAST ADDRESSES

CROSS REFERENCE TO RELATED APPLICATIONS

This application is a continuation of U.S. patent application Ser. No. 12/546,421, entitled "Adaptive Routing of Content Requests Using Multiple Anycast Addresses," filed on Aug. 24, 2009, now U.S. Pat. No. 8,296,458, the disclosure of which is hereby expressly incorporated by reference in its entirety.

FIELD OF THE DISCLOSURE

The present disclosure generally relates to communications networks, and more particularly relates to adaptive routing of content requests using multiple anycast addresses.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
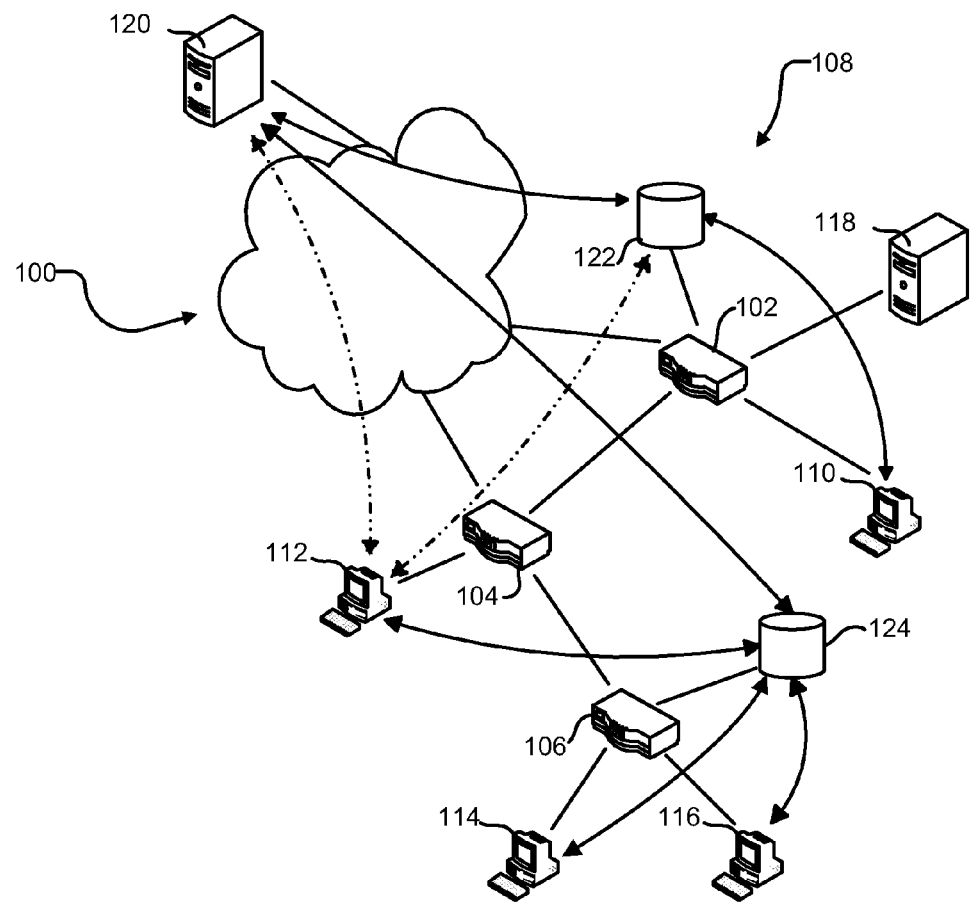
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally higher than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
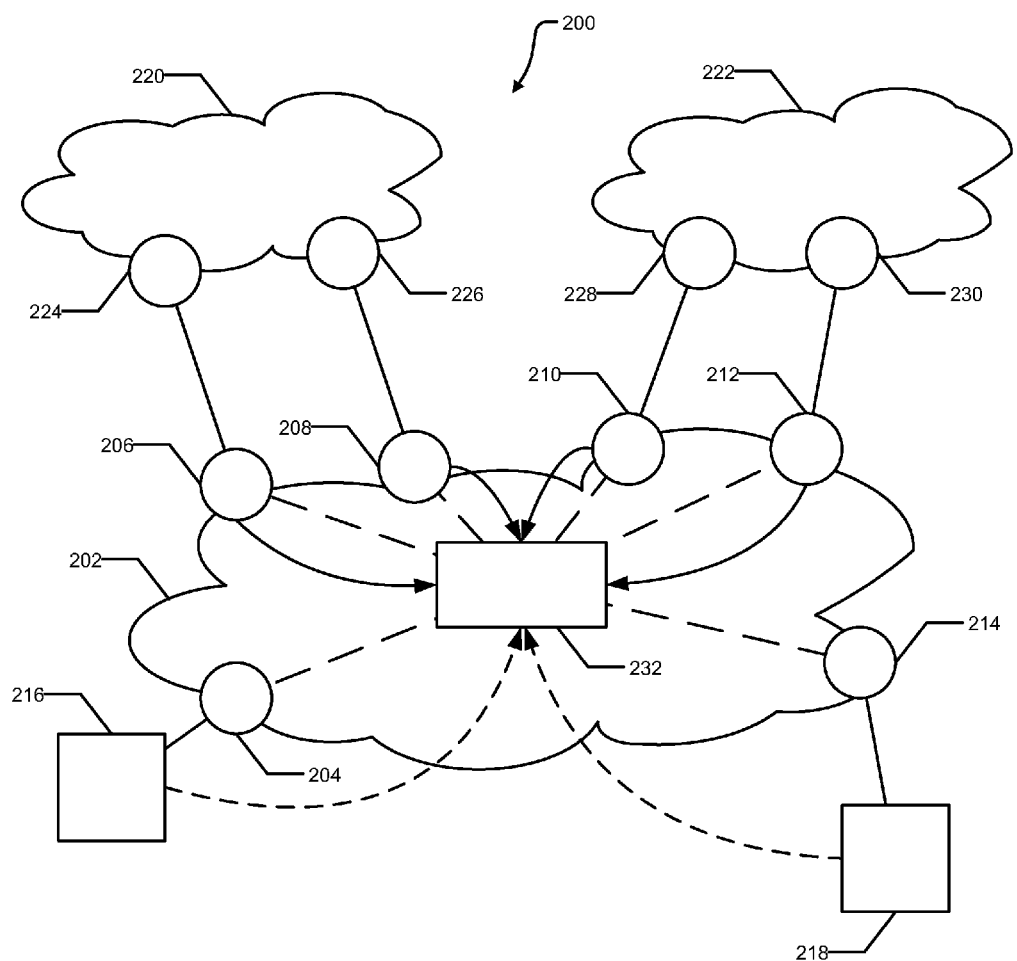
FIG. 2 is a block diagram illustrating an anycast CDN system in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204 through 214. The provider edge routers 204 through 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

In an embodiment, cache servers 216 and 218 can advertise, such as through Border Gateway Protocol (BGP), a shared anycast address to the CDN provider network 202, specifically to provider edge routers 204 and 214. Provider edge routers can propagate these routes to each of the provider edge routers 206 though 212. Provider edge routers 206 through 212 can direct traffic addressed to the anycast address to either of the cache servers 216 and 218 based on the least cost routing to the anycast address. Additionally, the provider edge routers 206 through 212 can advertise the anycast address to AS 220 and to AS 222.

In an alternate embodiment, anycast CDN system 200 can also include a route controller 232. The route controller 232 can exchange routes with provider edge routers 206 through 212 within the CDN provider network 202. As such, the route controller 232 can influence the routes selected by the provider edge routers 206 through 212. For example, provider edge routers 204 and 214 can advertise the anycast address to the route controller 232. The route controller 232 can provide a route to the anycast address to each of the provider edge routers 206 though 212. Provider edge routers 206 through 212 can direct traffic addressed to the anycast address to either of the cache servers 216 and 218 based on the routes provided by the route controller 232. Additionally, the route controller 232 can receive load information from cache servers 216 and 218 and can manipulate the route provided to provider edge routers 206 through 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it is undesirable to provide an anycast addresses to client systems within an unstable network that can be subjected to frequent internal routing changes.

Figure 3:
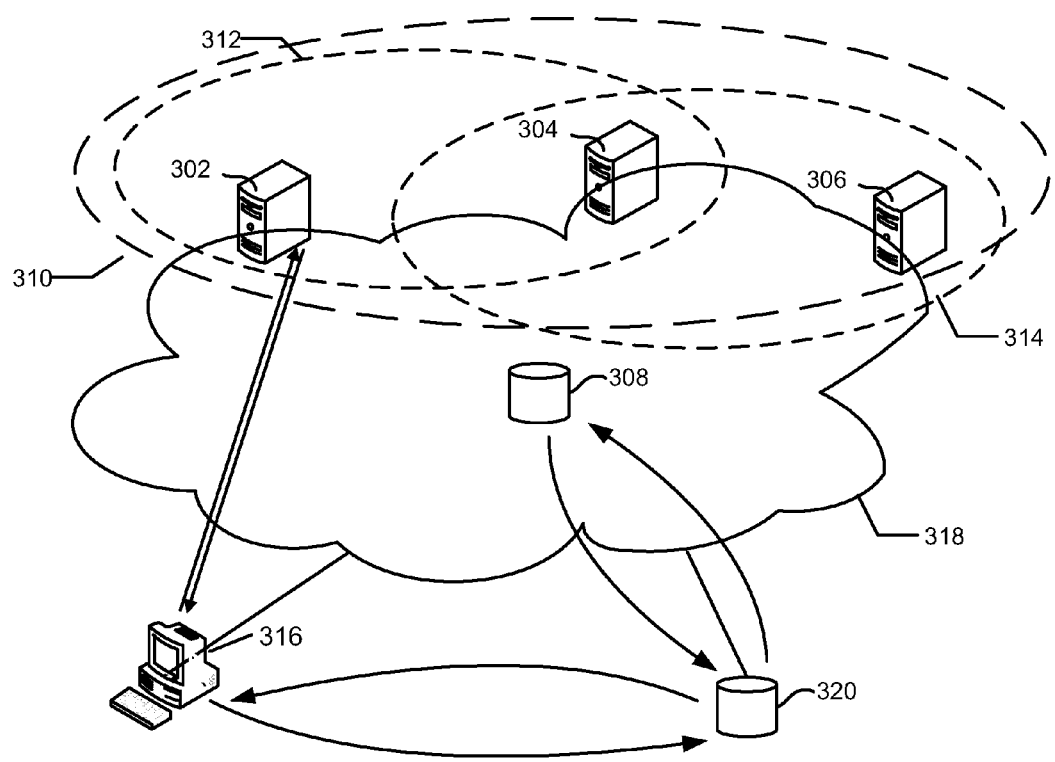
FIGS. 3 and 4 are block diagrams illustrating routing of requests in accordance with embodiments of the present disclosure.

FIG. 3 shows another embodiment of an anycast CDN generally designated 300 that can be used in conjunction with network 100. Anycast CDN 300 can include cache servers 302, 304, and 306, as well as CDN DNS server 308. While each of servers 302, 304, and 306 are represented by an individual system, the term "server" shall also be taken to include any individual system or collection of systems that are logically operating as a single server. For example, server 302 may include a load-balanced cluster of computer systems operating to cache content and provide content to a plurality of client systems.

All possible combinations of cache servers 302 through 306 can form a subset. For example, subset 310 can include cache servers 302, 304, and 306, subset 312 can include cache servers 302 and 304, and subset 314 can include cache servers 304 and 306. Additional subsets, such as the subset including cache servers 302 and 306, are not shown. Each subset can be assigned an anycast address. In an embodiment, subsets having only one member can use the unicast address of the single member and may not be assigned an anycast address. Cache servers 302 through 306 can respond to the anycast address of each of the subsets to which they belong. For example, cache server 302 belongs to both subset 310 and subset 312. Accordingly, cache server 302 can respond to the anycast address for both subset 310 and subset 312. Similarly, cache server 304 can respond to the anycast address for each of subsets 310 through 314, and cache server 306 can respond to the anycast address for both subset 310 and subset 314.

In an embodiment, client system 316 can request content from anycast CDN 300 through provider network 318. Specifically, client system 316 can request an address from Internet Service Provider (ISP) DNS server 320. ISP DNS server 320 can request an address from CDN DNS server 308. CDN DNS server 308 can select a subset for responding to the request. Generally, the selection for responding to the request can be the largest available subset(s). An available subset can be a subset in which no member cache servers are overloaded or otherwise unavailable. Accordingly, CDN DNS server 308 can provide the anycast address for subset 310 to the ISP DNS server 320, and ISP DNS server 320 can provide the anycast address to client system 316. Client system 316 can send a request to the anycast address for subset 310, which is directed to the closest cache server 302.

Figure 4:
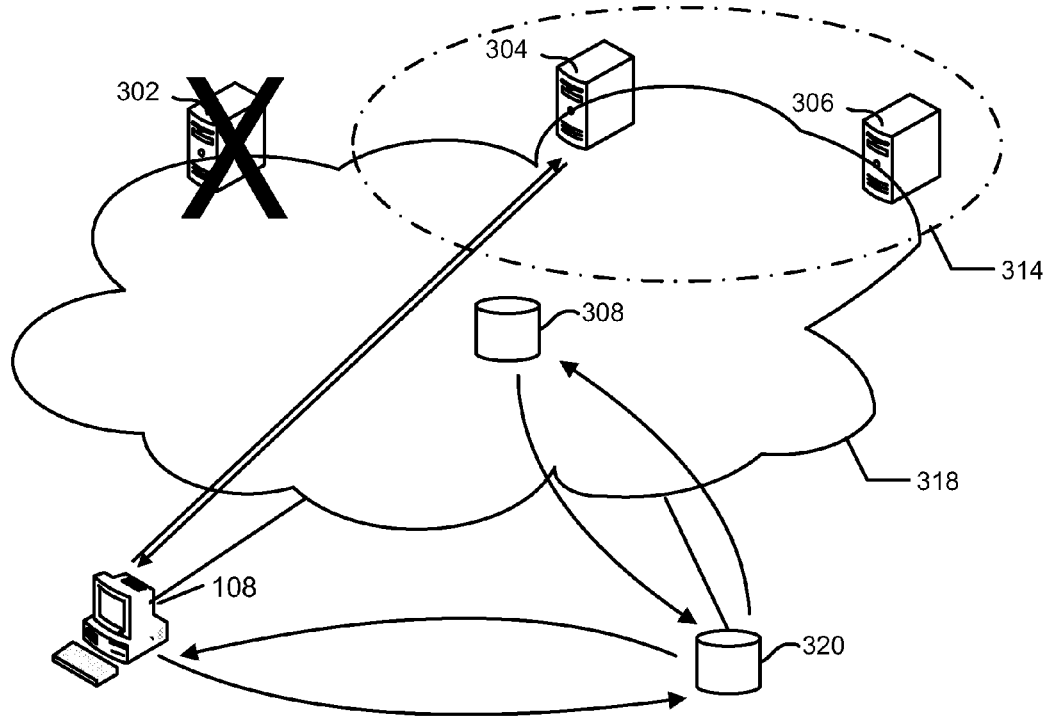

In another embodiment, shown in FIG. 4, cache server 302 can be unavailable. For example, cache server 302 may be non-operational, such as offline for maintenance or due to a malfunction, or may be overloaded. Accordingly, subsets 310 and 312 are not available subsets and subset 314 is the largest available subset. In response to a request for an address, CDN DNS server 308 can provide the anycast address of subset 314, and a request from client system 316 can be directed to the closest cache server of subset 314, specifically cache server 304.

Figure 5:
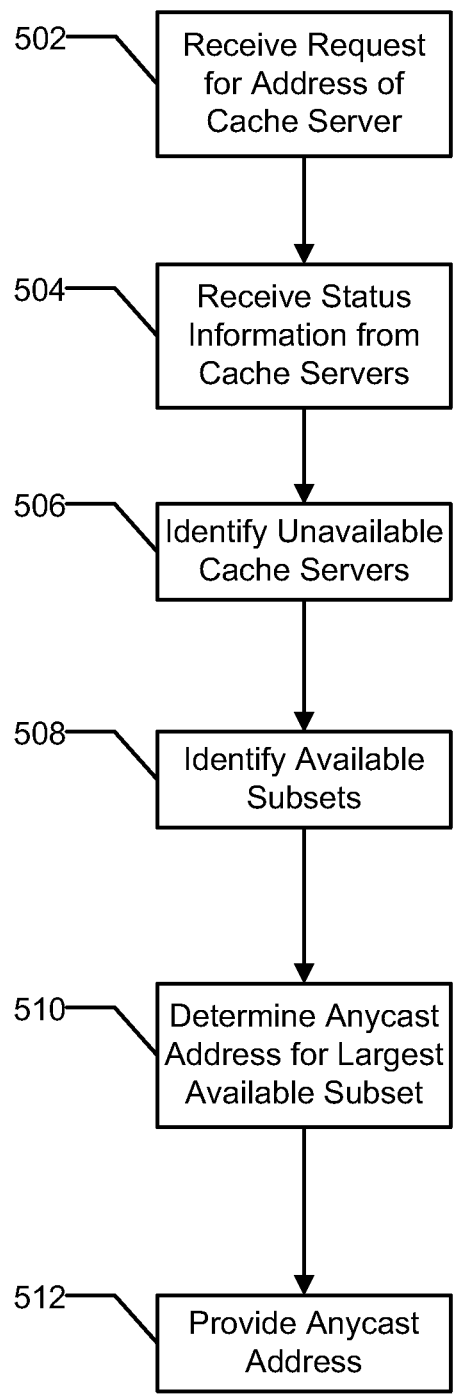
FIG. 5 is a flow diagram illustrating an exemplary method of providing an address in accordance with one embodiment of the present disclosure.

FIG. 5 illustrates an exemplary method of providing an IP address in response to a DNS hostname resolution request. At 502, the system can receive a request for an IP address of a cache server, such as cache server 302. At 504, the system can receive status information from each of the cache servers. The status information can include server load, CPU utilization, memory utilization, available bandwidth, or the like. When the system fails to receive status information from a cache server, the system may consider the cache server non-operational. At 506, the system can identify any cache server that is overloaded or otherwise unavailable. For example, the cache server may be offline for maintenance or there may be a network interruption to the cache server. At 508, the system can identify the available subsets. At 510, the system can determine an anycast address for the largest available subset, and at 512, the system can provide the anycast address in response to the request.

Figure 6:
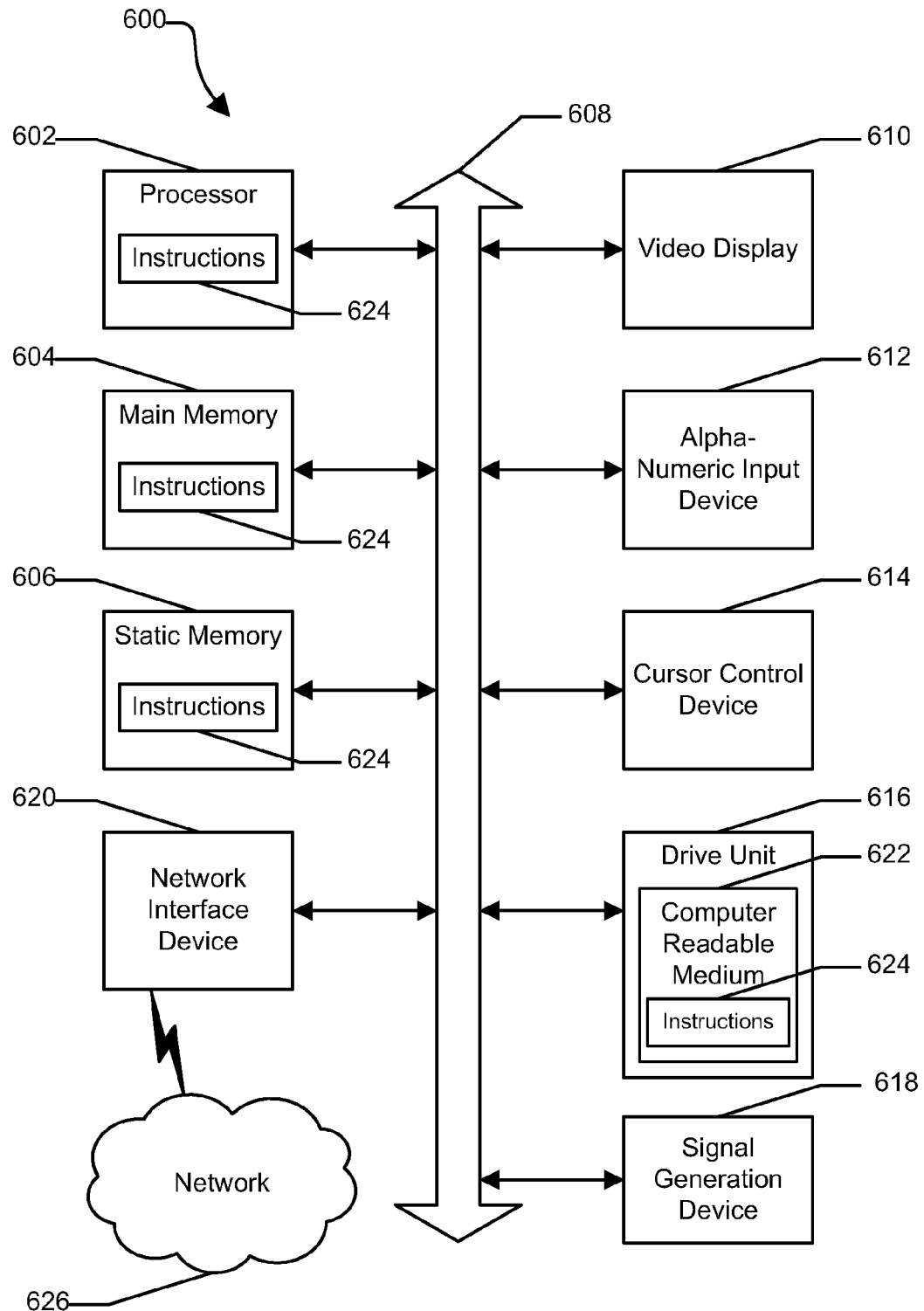
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices. Examples of computer system 600 can include cache server 302, client system 316, CDN DNS server 308, content server 120, router 204, and the like.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
    a plurality of cache servers each responding to a request, the cache servers divided into a plurality of subsets, wherein:
        each subset that includes more than one of the servers is assigned a different anycast address, wherein traffic addressed to the different anycast address can be directed to any one of the more than one of the servers; and
        one of the cache servers belongs to multiple subsets, and responds to the anycast address of each of the multiple subsets to which the one of the cache servers belongs; and
    a domain name server that performs operations comprising:
        receiving the request from a requestor for a cache server address;
        identifying an anycast address for a largest available subset, the largest available subset including no unavailable cache servers; and
        providing the anycast address of the largest available subset to the requestor.

2. The system of claim 1 wherein the domain name server further performs an operation comprising receiving status information from each cache server.

3. The system of claim 2 wherein the status information includes one of network bandwidth, central processing unit utilization, memory utilization, number of requests being served, and any combination thereof for the respective cache server.

4. The system of claim 1 wherein a cache server is unavailable when the cache server is non-operational, the central processing unit utilization exceeds a threshold, the memory utilization exceeds a threshold, the number of requests being served exceeds one of a threshold, the network bandwidth utilization exceeds a threshold, and any combination thereof.

5. The system of claim 1 wherein at least one of the plurality of cache servers comprises a load-balanced cluster of computer systems operating to cache content.

6. The system of claim 1 wherein the different anycast address is shared by the more than one of the servers.

7. The system of claim 1 further comprising:
    an edge router coupled to the more than one of the servers for directing the traffic addressed to the different anycast address to the any one of the more than one of the servers.

8. The system of claim 7 wherein the more than one of the servers advertise the different anycast address as a shared anycast address to the edge router.

9. A domain name server comprising:
    a port coupleable to a network; and
    a processor that executes instructions from memory to perform operations comprising:
        receiving a request from a requestor for an edge cache address;
        identifying a plurality of cache servers, wherein one of the cache servers includes a load-balanced cluster of computer systems operating to cache content;
        arranging the cache servers into a plurality of subsets, each subset including at least one cache server, wherein one of the cache servers belongs to more than one subset and responds to the anycast address of the multiple subsets to which the one cache server belongs;
        providing a different anycast address to each subset that includes at least two cache servers;
        determining a largest subset of available cache servers based on status information for each of the cache servers;
        identifying an anycast address for a largest available subset, the largest available subset including no unavailable cache servers; and
        providing the anycast address for the largest subset of available cache servers in response to the request.

10. The domain name server of claim 9 wherein the operations further comprise receiving the status information from the cache servers.

11. The domain name server of claim 10 wherein status information includes one of network bandwidth, central processing unit utilization, memory utilization, number of requests being served, and any combination thereof.

12. The domain name server of claim 9 wherein a cache server is unavailable when the cache server is non-operational, the central processing unit utilization exceeds a threshold, the memory utilization exceeds a threshold, the number of requests being served exceeds one of a threshold, the network bandwidth utilization exceeds a threshold, and any combination thereof.

13. The domain name server of claim 9 wherein traffic addressed to the different anycast address can be directed to any one of the at least two cache servers.

14. The domain name server of claim 9 wherein the different anycast address is shared by the at least two cache servers.

15. A method of directing requests from a client system to one of a plurality of cache servers, comprising:
    arranging the cache servers into a plurality of subsets, each subset including at least one cache server, wherein one of the cache servers belongs to more than one subset and is configured to respond to a shared anycast address of each of the multiple subsets to which the one cache server belongs;
    assigning shared anycast addresses to the subsets of the cache servers that include at least two cache servers;
    determining which of the cache servers are available;
    identifying a largest available subset based on status information for each of the cache servers;
    identifying, by utilizing instructions from memory that are executed by a processor, a largest available subset shared anycast address for a largest available subset, the largest available subset including no unavailable cache servers;
    receiving a request for an address of a cache server; and providing the largest available subset shared anycast address assigned to the largest available subset in response to the request.

16. The method of claim 15 further comprising receiving the status information from each of the cache servers.

17. The method of claim 16 wherein the status information includes one of network bandwidth, central processing unit utilization, memory utilization, number of requests being served, and any combination thereof.

18. The method of claim 15 wherein a cache server is not available when the cache server is non-operational, the central processing unit utilization exceeds a threshold, the memory utilization exceeds a threshold, the number of requests being served exceeds one of a threshold, the network bandwidth utilization exceeds a threshold, and any combination thereof.

19. The method of claim 15 further comprising:
directing traffic addressed to a shared anycast address to one of the at least two cache servers of the subset of the cache servers corresponding to the shared anycast address.

20. The method of claim 15 wherein at least one of the cache servers comprises a load-balanced cluster of computer systems operating to cache content.

* * * * *